US008125713B2

(12) United States Patent
Gluckstad

(10) Patent No.: US 8,125,713 B2
(45) Date of Patent: Feb. 28, 2012

(54) LIGHT BEAM GENERATION

(75) Inventor: Jesper Gluckstad, Frederiksberg (DK)

(73) Assignee: Danmarks Tekniske Universitet, Lyngby (DK)

( * ) Notice: Subject to any disclaimer, the term of this patent is extended or adjusted under 35 U.S.C. 154(b) by 335 days.

(21) Appl. No.: 12/305,264

(22) PCT Filed: Jun. 18, 2007

(86) PCT No.: PCT/DK2007/000294
§ 371 (c)(1),
(2), (4) Date: Aug. 20, 2009

(87) PCT Pub. No.: WO2007/147407
PCT Pub. Date: Dec. 27, 2007

(65) Prior Publication Data
US 2009/0310206 A1    Dec. 17, 2009

Related U.S. Application Data

(60) Provisional application No. 60/814,553, filed on Jun. 19, 2006.

(30) Foreign Application Priority Data

Jun. 19, 2006 (DK) ................................. 2006 00834

(51) Int. Cl.
*G02B 27/46* (2006.01)
(52) U.S. Cl. ..................... 359/559; 359/562; 359/900

(58) Field of Classification Search .................. 359/238, 359/562, 558, 559, 900
See application file for complete search history.

(56) References Cited

U.S. PATENT DOCUMENTS

| 6,021,223 A | 2/2000 | Toyoda et al. |
| 2003/0010763 A1 | 1/2003 | Fukuchi et al. |
| 2006/0043184 A1 | 3/2006 | Fukuchi et al. |

FOREIGN PATENT DOCUMENTS

| EP | 1630588 | 3/2006 |
| WO | 9634307 | 10/1996 |

*Primary Examiner* — Jack Dinh
(74) *Attorney, Agent, or Firm* — Volentine & Whitt, PLLC

(57) ABSTRACT

A method and system for synthesizing controllable light beams includes a spatially modulated light source that generates electromagnetic radiation with a set of replicas of a predetermined symbol, s, positioned at desired positions ($x_s$, $y_s$) in an object plane o(x, y) intersecting, preferably perpendicular to, the direction of propagation of the electromagnetic radiation, and having spatial amplitudes $a(x-x_s, y-y_s)$, spatial phases $\phi(x-x_s, y-y_s)$, and spatial polarisation vectors $p(x-x_s, y-y_s)$, a Fourier transforming lens for Fourier transforming the electromagnetic radiation, a first spatial light modulator for phase shifting the transformed electromagnetic radiation with the phase $-\Phi(u, v)$ of S*, S* the complex conjugate of the transformed symbol, a Fourier transforming lens for Inverse Fourier transforming the spatially modulated radiation, a set of light beams are formed propagating through the inverse Fourier plane (x', y') at desired positions ($x'_s$, $y'_s$), and a controller for controlling the position of a replica of the symbol, for movement of the light beam.

18 Claims, 6 Drawing Sheets

LIGHT BEAM GENERATION

CROSS REFERENCE TO RELATED APPLICATIONS

This application is the national phase under 35 U.S.C. 371 of PCT International Application No. PCT/DK2007/000294 which has an international filing date of Jun. 18, 2007, and also claims priority under 35 U.S.C. 119 to Danish application PA 2006 00834 filed on Jun. 19, 2006, and to U.S. Patent Application No. 60/814,553, filed on Jun. 19, 2006, which applications are hereby incorporated by reference in their entirety for all purposes as if fully set forth herein.

BACKGROUND OF THE INVENTION

1. Field of the Invention

The invention relates to a method and a system for synthesizing a set of controllable light beams.

2. Description of the Related Art

It is well known to form an image on an illuminated surface of a body by absorption or blocking of energy of an illuminating beam. For example in an overhead projector, an overhead transparent absorbs or blocks part of the light beam of the projector whereby a large image of an overhead is formed on a screen. However, this result in a loss of light intensity since part of the emitted light from such an image forming system is reflected or absorbed.

To avoid loss of energy causing, e.g., loss of light intensity of the synthesized intensity pattern, power dissipation generating heat in components of the system, etc., methods and systems have been developed wherein the phase of a light beam is modulated instead of the amplitude or intensity of the light beam, since modulation of the phase of the light beam does not result in loss of energy. The phase modulation is followed by conversion of phase modulation into amplitude or intensity modulation.

Imaging methods and systems may also be used in connection with phase modulation. These methods and systems are characterized by the fact that the intensity of a point of a picture formed by conversion of phase modulation into intensity modulation will depend upon the phase modulation value of one point of the phase modulator only since this point is imaged onto the picture point in question by the imaging system.

This one-to-one relationship makes the design of phase modulators in these systems simple. Methods and systems of this kind are named phase contrast imaging methods and systems.

Phase contrast imaging methods were originally developed within the field of microscopy. Many objects of interest in microscopy are largely transparent, thus absorbing little or no light. When light passes through such an object, the predominant effect is the generation of a spatially varying phase shift which can not be seen by a human since the eye of a human responds to light intensity and colour and does not respond to the phase of light.

In 1935, Fritz Zernik proposed a phase contrast technique which relies on spatial-filtering principles and has the advantage that the observed intensity is linearly related to the phase shift introduced by the object.

A generalized phase contrast imaging method and system for synthesizing a prescribed intensity pattern is disclosed in WO 96/34307, which is hereby incorporated by reference. The generalized method is not based on the so-called Zernike approximation that the phase shift is less than 1 radian. An improved method is provided without this approximation and based on imaging with a simple one-to-one mapping of resolution elements or pixels of a spatial phase modulator onto resolution elements of the generated intensity pattern.

One application of the present invention relates to manipulation of micro-objects, such as micro-components, biological cells, etc. using electromagnetic gradient forces.

It is well-known that in a strongly focused laser beam having an approximately Gaussian intensity profile, radiation pressure scattering and gradient force components are combined to provide a point of stable equilibrium located close to the focus of the laser beam. Scattering force is proportional to optical intensity and acts in the direction of the incident laser light. Gradient force is proportional to the optical intensity and points in the direction of the intensity gradient.

This effect is utilized in so-called optical tweezers or optical traps wherein the optical gradient forces in a focused light beam trap a small micro-object at the focal point of the light beam. The micro-object is typically immersed in a fluid medium whose refractive index is smaller than that of the micro-object. The optical tweezer technique has been generalized to enable manipulation of reflecting, absorbing and low dielectric constant micro-objects. Typically, a Gaussian beam is used for trapping of micro-objects with a refractive index that is higher than the refractive index of its surroundings while a donut beam is used for trapping of a micro-object with refractive index that is lower than the refractive index of its surroundings.

BRIEF SUMMARY OF THE INVENTION

It is an object of the present invention to provide a method and an apparatus for generation of a set of controllable light beams.

The above-mentioned and other objects are fulfilled according to the present invention by provision of a method for synthesizing a set of light beams, comprising the steps of generating electromagnetic radiation with a set of replicas of a predetermined symbol, s, positioned at respective desired positions $(x_s, y_s)$ in an object plane $o(x, y)$ intersecting, preferably perpendicular to, the direction of propagation of the electromagnetic radiation, and having spatial amplitudes $a(x-x_s, y-y_s)$, spatial phases $\phi(x-x_s, y-y_s)$, and spatial polarisation vectors $p(x-x_s, y-y_s)$, Fourier transforming the electromagnetic radiation, multiplying, i.e. phase shifting, the Fourier transformed electromagnetic radiation with the phase $-\Phi(u, v)$ of $S^*$, $S^*$ is the complex conjugate of the Fourier transformed symbol s, Inverse Fourier transforming the spatially modulated radiation, whereby a set of light beams are formed propagating through the inverse Fourier plane $(x', y')$ at desired positions $(x'_s, y'_s)$, and moving a light beam by movement of the corresponding replica of the symbol, s, in the object plane.

The above-mentioned and other objects are fulfilled according to the present invention by provision of a system for synthesizing a set of light beams, comprising a spatially modulated light source for generation of electromagnetic radiation with a set of replicas of a predetermined symbol, s, positioned at respective desired positions $(x_s, y_s)$ in an object plane $o(x, y)$ intersecting, preferably perpendicular to, the direction of propagation of the electromagnetic radiation, and having spatial amplitudes $a(x-x_s, y-y_s)$, spatial phases $\phi(x-x_s, y-y_s)$, and spatial polarisation vectors $p(x-x_s, y-y_s)$, a Fourier transforming lens for Fourier transforming the electromagnetic radiation, a first spatial light modulator for phase shifting the Fourier transformed electromagnetic radiation with the phase $-\Phi(u, v)$ of S*, S* is the complex conjugate of the Fourier transformed symbol s, a Fourier transforming lens for Inverse Fourier transforming the spatially modulated radiation, whereby a set of light beams are formed propagating through the inverse Fourier plane (x', y') at desired positions $(x'_s, y'_s)$, and a controller for controlling the position of a replica of the symbol, s, for movement of the corresponding light beam.

It is well-known in the art of optical matched filters that the method and apparatus according to the present invention in principle generate optical delta-functions in the Inverse Fourier plane (x', y') at positions corresponding to the respective positions in the object plane o(x, y) of the respective replicas of a symbol s.

According to the present invention this well-known characteristic is exploited to generate high intensity light beams at controllable positions. Thus, a number N of light beams are obtained by generation of N replicas of a symbol, s, in the object plane o(x, y) at N positions $(x_s, y_s)$ corresponding to the N desired positions $(x'_s, y'_s)$ of the generated light beams. The position of a light beam $(x'_s, y'_s)$ may be changed by a corresponding change of the position $(x_s, y_s)$ of the corresponding replica of symbol s.

The method and system according to the present invention may for example be utilized for optical tweezers for manipulation of micro-objects, such as micro-components, biological cells, etc., within a predetermined working volume.

The method and system according to the present invention may also be utilized for laser machining, marking, branding, trimming, hardening, scribing, labelling, welding and cutting on two-and three-dimensional surfaces especially by use of $CO_2$ and Nd:YAG laser based systems. For phase-modulated symbols, energy is not absorbed in the system (thereby preventing damage of the optical hardware) and instead substantially all energy is utilized to increase the intensity level of the desired light beams. High power can be delivered to selected regions on a work piece simultaneously.

Other examples of applications of the method and system according to the present invention are: Efficient and dynamic spot-array generators for generation of bias or holding beams for arrays of optoelectronic elements, such as bistable elements, photonic switches and smart pixels, Generation of structured light (lossless) for machine vision applications, e.g. periodic and skew periodic mesh grid illumination that can be updated in parallel, Photolithographic applications (laser 3D direct writing in parallel without the need for sequential scanning), e.g. high power laser direct writing of waveguides in Ge-doped silica, Spatial light intensity modulation in general by use of pure phase modulation (radiation focusators), Laser beam shaping (dynamic), Highly efficient parallel pattern projection without the need for a laser scanning device, Dynamic Infrared Scene Projection (DIRSP), Exposure device for grating and mask production, LIDAR applications, Laser printing in parallel, Laser show applications, and Atmosphere research, etc.

A symbol, s, is a pattern of amplitude and/or phase and/or polarisation variation of electromagnetic radiation within a finite area in space. A point in the symbol $(x_s, y_s)$ is defined as a reference point for indication of the position of the symbol.

Typically, the reference point $(x_s, y_s)$ constitutes a centre of the symbol. If the symbol comprises amplitude variations, the symbol may be visible. Signs, textures, icons, marks are examples of symbols; however, any arbitrary amplitude and/or phase variation of electromagnetic radiation within a finite area may constitute a symbol.

Preferably, the symbol is designed for generation of light beams with a high contrast ratio between the amplitude at the centre of the beam and the average amplitude outside the beams.

In a preferred embodiment of the invention, the light beams are generated with low loss of electromagnetic energy by generation of symbols, s, with substantially uniform amplitude and a predetermined spatial phase variation.

A replica of the symbol, s, is a substantially identical copy of the symbol, s, possibly resized. Preferably, the replicas are identical copies, possibly of different sizes; however, variations in the components utilized for generation of the replicas may lead to generation of replicas with small differences that will not affect the performance of the system in any significant way. Also, utilization of pixelated components for generation of the replicas may cause a replica to change slightly upon repositioning of the replica with a displacement that is not an integer multiple of the pixel size.

Each of the replicas of the symbol, s, may be generated by spatial phase modulation of electromagnetic radiation, e.g. with a second spatial light modulator divided into individual resolution elements for modulation of the phase of incident electromagnetic radiation by phase values $\phi(x, y)$ of individual resolution elements (x, y) of the second spatial light modulator. In a preferred embodiment, the symbol, s, is a binary coded symbol, i.e. in each point (x, y) of the symbol, s, centred at coordinates $(x_s, y_s)$, the electromagnetic field with amplitude, a, and phase, $\phi$, has one of two values $(a_0, \phi_0)$ or $(a_1, \phi_1)$. $a_0$ may be equal to $a_1$ or $\phi_0$ may be equal to $\phi_1$. In a phase-only coded symbol, $a_0$ is equal to $a_1$.

The electromagnetic radiation may be of any frequency range of the electromagnetic spectrum, i.e. the gamma frequency range, the ultraviolet range, the visible range, the infrared range, the far infrared range, the X-ray range, the microwave range, the HF (high frequency) range, etc.

The electromagnetic radiation may be generated by a coherent source of electromagnetic radiation, such as a laser, a maser, a phase-locked laser diode array, etc.

The electromagnetic radiation may also be generated by a high pressure arc lamp, such as an Hg lamp, a Xe lamp, etc., with the advantage compared to a laser light source that speckle noise is reduced.

An incandescent lamp or an LED may also be used as a source of electromagnetic radiation.

A spatial light modulator is a component that changes the amplitude and/or phase and/or polarisation of an electromagnetic wave incident upon it. The spatial light modulator may transmit or reflect the incident electromagnetic wave. Typically, the spatial light modulator is divided into a number of resolution elements each of which modulates the incident electromagnetic wave by changing its amplitude and/or phase and/or polarisation by a specific predetermined value. The predetermined values are assigned to each resolution element in different ways depending upon the technology applied in the spatial light modulator. For example, each resolution element may be addressed either optically or electrically. The electrical addressing technique resembles the addressing technique of solid-state memories in that each resolution element can be addressed through electronic circuitry to receive a control signal corresponding to the amplitude and/or phase change to be generated by the addressed resolution element. The optical addressing technique addresses each resolution element by pointing a light beam on it, the intensity of the light beam corresponding to the amplitude and/or phase change to be generated by the resolution element illuminated by the light beam.

Spatial amplitude and/or phase and/or polarisation modulation may be realized utilizing a fixed phase mask, a liquid crystal device based on liquid crystal display technology, a MEMS (micro electro mechanical system), a MOEMS (micro opto-electro-mechanical system), such as a dynamic mirror device, a digital micro-mirror array, a deformable mirror device, etc. a membrane spatial light modulator, a laser diode array (integrated light source and phase modulator), smart pixel arrays, etc.

Seiko-Epson produces a transmitting liquid crystal SLM (LC-SLM) having a high resolution matrix of transparent liquid crystal elements wherein the relative permittivity of each element can be electrically modulated in order to vary the refractive index and thereby the optical path length of the element.

Meadowlark produces a parallel-aligned liquid crystal (PAL-SLM) with a high fill factor, but this device has a very low resolution in that it contains only 137 phase-modulating elements.

Hamamatsu Photonics produces a dynamically controllable PAL-SLM with VGA or XGA resolution.

Texas Instruments produces a Digital Mirror Device (DMD) having an array of mirrors, each of which can be tilted between two positions.

The first spatial light modulator is typically a fixed phase mask, such as an optically flat glass plate coated with a dielectric layer in the region wherein the modulated electromagnetic field is phase shifted, −Φ, in relation to the remaining part of the electromagnetic field. However, the spatial light modulators mentioned in the previous section may also be used for the first spatial light modulator. In addition, non-linear materials providing self-phase modulation, such as Kerr-type materials, can also be used for introducing the phase shift.

One or more replicas of the symbol, s, may be generated by an array of light sources, such as an array of vertical cavity surface emitting lasers, VCSELs. An array of VCSELs is an attractive source of a plurality of substantially circular laser beams. The array may be one-dimensional or two-dimensional and the generated beams are Gaussian shaped with a low divergence and a low relative intensity noise due to the absence of mode competition and thus, the beams may be focused to very small spot sizes. Polarization may be controlled by asymmetric current injection.

The array of VCSELs may comprise integrated sub-wavelength transmission gratings SWTGs for enhancement of the VCSELs polarization properties. Preferably, the SWTGs is manufactured with nano-imprint lithography that offers a low cost, high throughput, reliable means to fabricate SWTGs. SWTGs are gratings with a period less than the wavelength of light and no non-zero order diffraction.

A system according to the invention may comprise a 4f-lens configuration (two Fourier transforming lenses utilizing transmission of light or one Fourier transforming lens utilizing reflection of light). However, any optical imaging system providing a Fourier plane for the first spatial light modulator may be comprised in the system.

In a preferred embodiment of the invention, a phase shift is performed at the zero-order diffraction region of the Fourier plane in addition to the phase shifting with the phase of S*, S* is the complex conjugated Fourier transform of the symbol, s. In one embodiment, the value of the phase shift is π. The further phase shift is performed for increased contrast of the generated light beams so that areas outside the light beams substantially will not be illuminated, and preferably the generated amplitude at the inverse Fourier plane will be substantially zero outside the light beams.

In addition to the phase shifting in the Fourier plane with the phase of S* which is the complex conjugated Fourier transform of the symbol s, multiplication with the reciprocal amplitude of S* may also be performed.

According to a preferred embodiment of the invention, a second spatial light modulator is positioned at the front focal plane of a lens while the first spatial light modulator is positioned in the back focal plane of the lens, whereby an electromagnetic field at the second spatial light modulator is Fourier transformed by the lens into an electromagnetic field at the first spatial light modulator.

The first spatial light modulator may be adapted to further phase shift the part of the electromagnetic radiation at the zero-order diffraction region without further phase shifting the remaining part of the electromagnetic radiation or, the first spatial light modulator may be adapted not to further phase shift the part of the electromagnetic radiation at the zero-order diffraction region and to further phase shift the remaining part of the electromagnetic radiation.

The last alternative is preferred when the energy level of the part of the electromagnetic radiation at the zero-order diffraction region is so high that the phase shifting part of the first spatial light modulator will be destroyed by it. For example in laser cutting, the amplitude at the zero-order diffraction region of the laser beam can be so high that a phase shifting dot positioned at the zero-order diffraction region would evaporate. It is also possible to block the electromagnetic radiation (no transmittance) in the zero-order diffraction region, however, the blocked energy of the radiation is then lost.

According to another preferred embodiment of the invention, the first spatial light modulator is not positioned in the back focal plane of the lens but in the Fresnel region of the lens instead. In this case, the electromagnetic field at the first spatial light modulator will be given by a Fresnel transformation of the electromagnetic field with the symbols, s. This further complicates the mathematics and the design procedures. However, the Fresnel transformation may be calculated from a Fourier transformation by multiplication of the amplitude and phase values of the electromagnetic radiation with the symbols s with a quadratic phase factor followed by a Fourier transformation.

According to a preferred embodiment of the invention, the shape of the region of the first spatial light modular located at the zero-order diffraction region for further phase shifting of the radiation substantially matches the spatial frequency content of radiation with the symbols, s, e.g. to optimize the desired separation of the part of the electromagnetic radiation to be further phase shifted from the remaining part of the electromagnetic radiation.

The system may further comprise zooming means for variable scaling of the synthesized intensity pattern. The zooming of the imaging system may be dynamically controllable.

According to the present invention, the power of the radiation source may be controllable.

In a preferred embodiment of the invention, two or more beams may intersect each other at selected intersecting angles preferably with focal points at the intersection, for further improvement of the trapping of a micro-object. For example, when a micro-object is trapped at the intersection of a plurality of beams, the focusing requirements of the individual beams are relaxed.

Beams may intersect each other at a 180° intersection angle, i.e. they may propagate along substantially the same axis of propagation but in opposite directions, preferably with focal points at substantially the same position but slightly displaced, thereby forming a significant trapping force along the propagation axis of the beams, preferably for trapping of a micro-object at the coinciding focal points of the counter-propagating beams.

Further, the direction of the trapping forces, such as the electromagnetic field gradient, at the intersection may be controlled by selective control of the field strength of the individual electromagnetic beams whereby the position of a trapped micro-object may be controlled in three dimensions.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
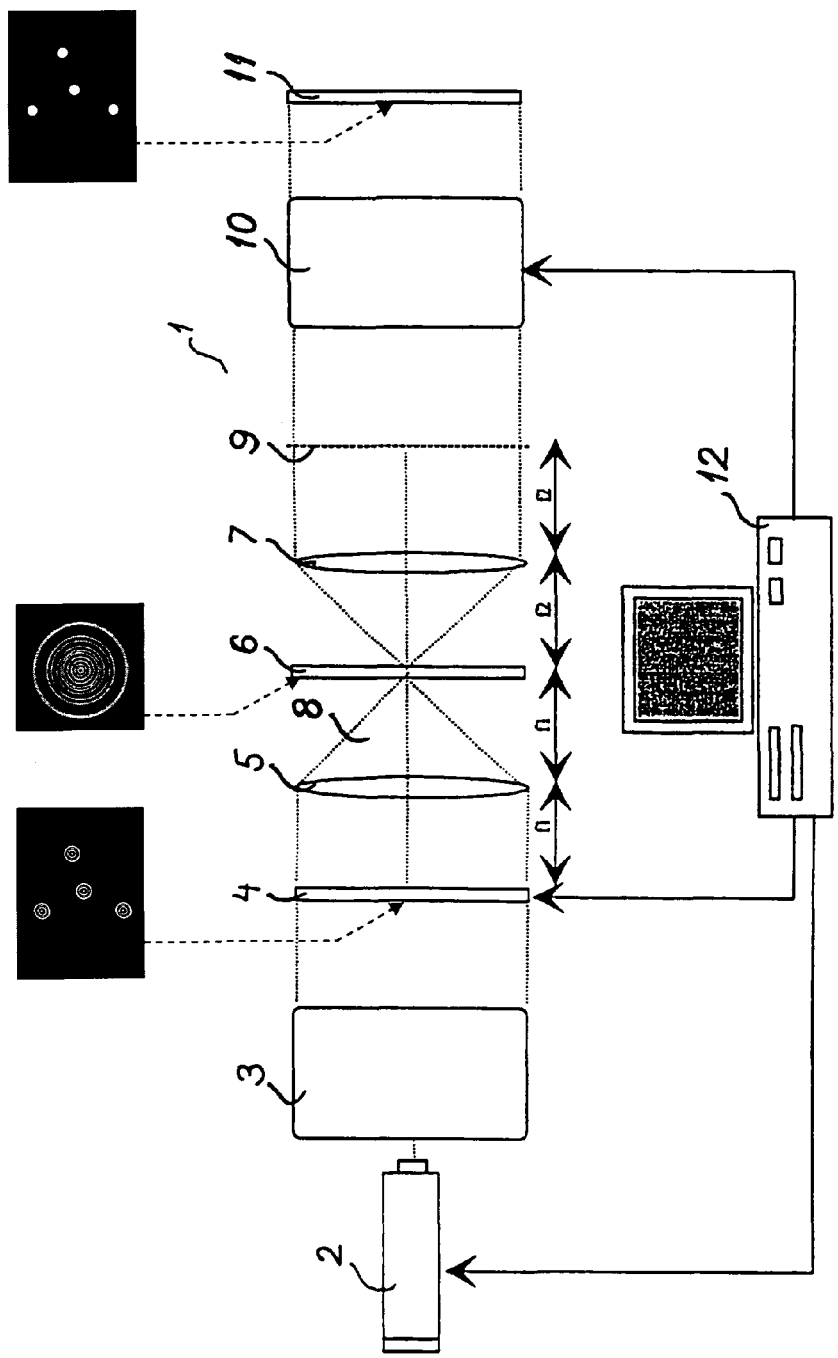
FIG. 1 shows a 4f optical embodiment of the present invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 shows a 4f imaging system 1. A laser 2 emits a light beam which is expanded by a beam expander 3 into a plane light wave of uniform intensity and directs it towards a second spatial light modulator 4 which in the illustrated embodiment phase and/or amplitude and/or polarisation modulates the incident light. For example, the four exemplary symbols, s, shown at the second spatial light modulator 4, and illustrated in more detail in FIG. 5, may be generated by the second spatial light generator 4. The light beam is transmitted through the second spatial light modulator 4 and a Fourier transforming lens 5. The second spatial light modulator is positioned in the front focal plane of the lens 5 and a first spatial light modulator 6 is positioned in the back focal plane of the lens 5 that is also the front focal plane of a lens 7. The Fourier transforming lenses 5, 7 need not have identical focal lengths. Different focal lengths lead to a magnification ratio different from one. The first spatial light modulator 6 phase shifts the incident Fourier transformed electromagnetic radiation with the phase of S* which is complex conjugated Fourier transform of the symbol, s, and additionally phase shifts the zero order diffraction part 8 of the incident radiation by a value θ. In the illustrated embodiment θ is equal to π. For example, the exemplary phase pattern shown at the first spatial light modulator 6, and shown in more detail in FIG. 4, may be generated by the first spatial light modulator 6. It should be noted that the further phase shift θ in the zero order diffraction region is not shown. The light beams traverse the back focal plane 9 (x', y') of the lens 7 and a dynamic focusing system 10 directs the beams onto a working volume 11. An exemplary resulting beam pattern is illustrated at the working volume 11.

The optical system is controlled by a computer 12. The computer 12 comprises interface means for addressing each of the resolution elements of the second spatial light modulator 4 and transmitting the symbol modulation pattern s to the addressed resolution element (x, y). The computer 12 can also comprise interface means for addressing each of the resolution elements of the first spatial light modulator 6.

Further, the computer 12 comprises laser control means for controlling the power of the laser 2 and imaging control means for controlling the focusing and the image ratio of the dynamic focusing system 10. The computer 12 also comprises input means, such as a keyboard, a diskette drive, an optical disc drive, a network interface, a modem, etc, for receiving desired light beam positions (x'$_s$, y'$_s$) from the user.

Optionally, the phase shift of the first spatial light modulator 6 is adjustable and controllable by optional phase control means of the computer 12 which may be further adapted to adjust the phase shift for maximum contrast, i.e. so that outside the light beams, the light intensity will be zero.

Figure 2:
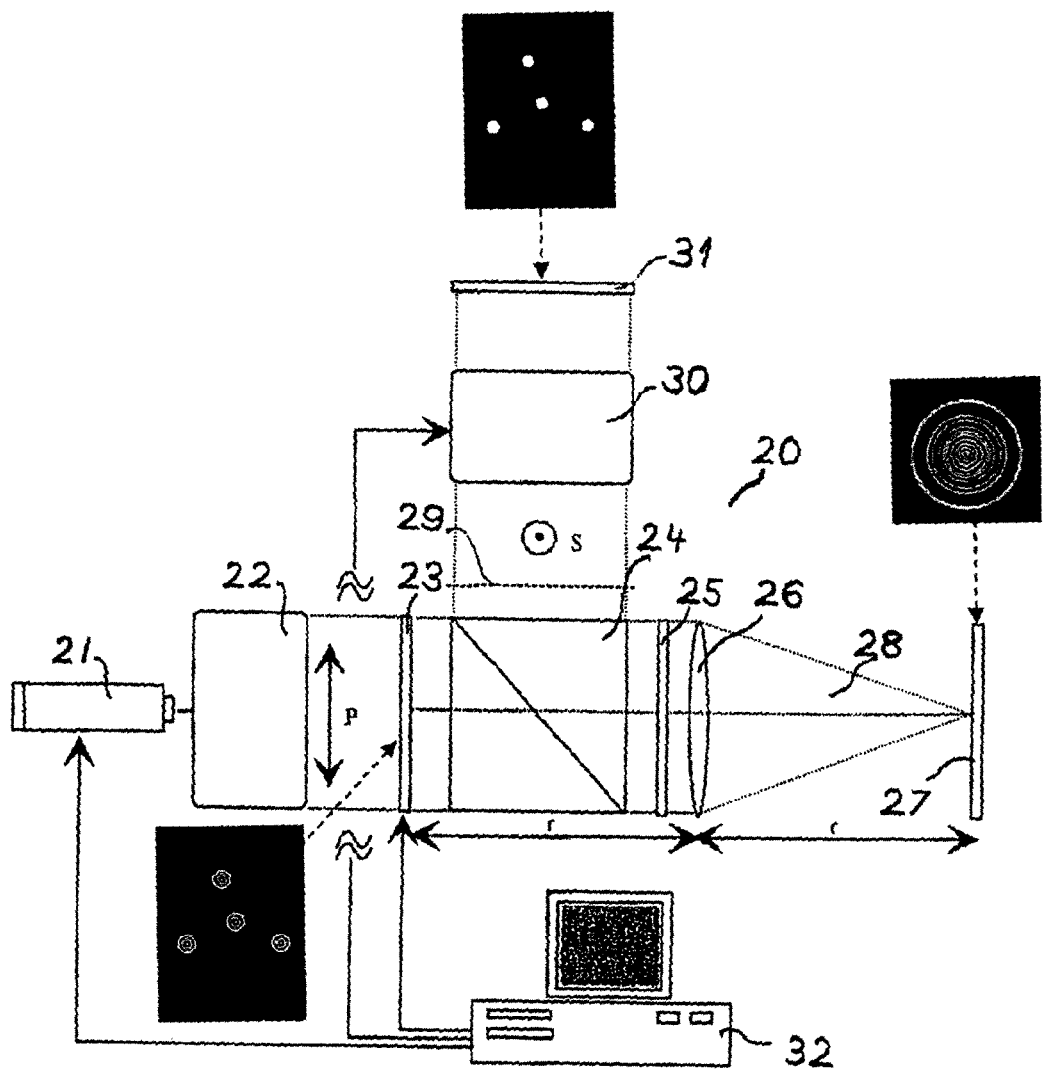
FIG. 2 shows a 2f optical embodiment of the present invention.

FIG. 2 shows a 2f imaging system 20. A laser 21 emits a light beam which is expanded by a beam expander 22 into a plane light wave of uniform intensity and directs it towards a second spatial light modulator 23 and a polarization beam splitter 24 and a quarter-wave plate 25. For example, the four exemplary symbols, s, shown at the second spatial light modulator 23, and illustrated in more detail in FIG. 5, may be generated by the second spatial light generator 23. The polarization beam splitter 24 and the quarter-wave plate 25 allows beam-splitting of light of a specific linear polarization without the power loss associated with conventional beamsplitters due to splitting of the beam in both directions of transmission through the beam-splitter. After transmission through the polarization beam splitter 24 and the quarter wave plate 25, the light beam is transmitted through a Fourier transforming lens 26 and is reflected from the first spatial light modulator 27. For example, the exemplary phase pattern shown at the first spatial light modulator 27, and shown in more detail in FIG. 4, may be generated by the first spatial light modulator 27. It should be noted that in the illustrated embodiment a further phase shift θ is added to this phase pattern in the zero order diffraction region. The second spatial light modulator 23 is positioned in the front focal plane of the lens 26 and the first spatial light modulator 27 is positioned in the back focal plane of the lens 26. The first spatial light modulator 27 phase shifts the incident Fourier transformed electromagnetic radiation with the phase of S* which is the complex conjugated Fourier transform of a symbol, s, and further phase shifts the zero order diffraction part 28 of the light that is phase or amplitude encoded by the second spatial light modulator 23. The light beams traverse the back focal plane 29 (x', y') of the lens 26 and a dynamic focusing system 30 directs the beams onto a working volume 31. An exemplary resulting beam pattern is illustrated at the working volume 31. As described for the system shown in FIG. 1, the system 20 is controlled by a computer 32.

Figure 3:
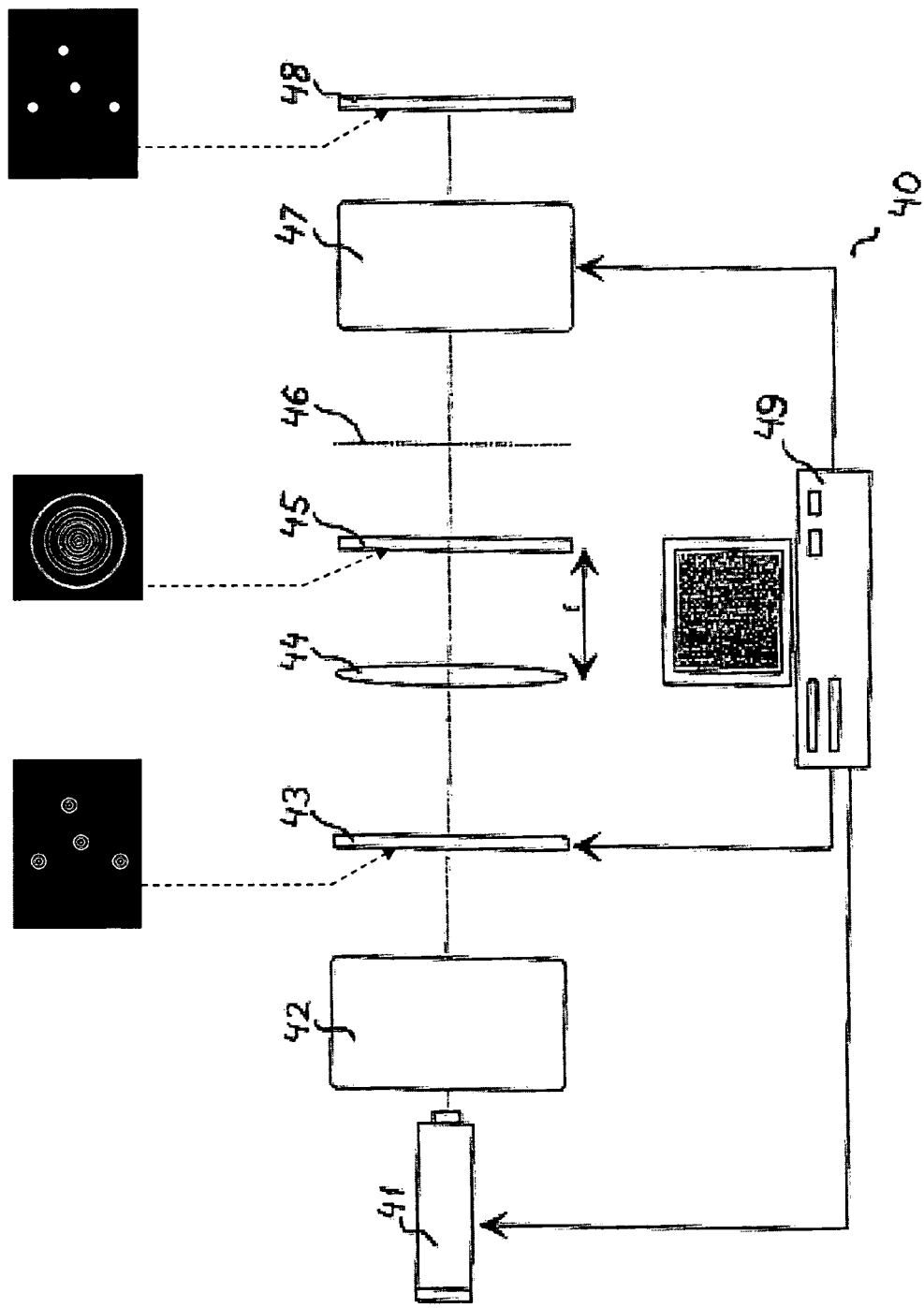
FIG. 3 shows a 1f optical embodiment of the present invention.

FIG. 3 shows a 1f phase contrast imaging system 40. A laser 41 emits a light beam which is expanded by a beam expander 42 into a plane light wave of uniform intensity and directs it towards a second spatial light modulator 43. For example, the four exemplary symbols, s, shown at the second spatial light modulator 43, and illustrated in more detail in FIG. 5, may be generated by the second spatial light generator 43. The light beam is transmitted through the second spatial light modulator 43 and an image forming lens 44. The first spatial light modulator 45 positioned in the back focal plane of the lens 44 phase shifts the incident Fourier transformed electromagnetic radiation with the phase of S* which is complex conjugated Fourier transform of a symbol, s. For example, the exemplary phase pattern shown at the first spatial light modulator 45, and shown in more detail in FIG. 4, may be generated by the first spatial light modulator 45. It should be noted that in the illustrated embodiment a further phase shift θ is added to this phase pattern in the zero order diffraction part of the light phase and/or amplitude and/or polarisation encoded by the second spatial light modulator 43. The light beams traverse the image plane 46 of the lens 44 and a dynamic focusing system 47 directs the beams onto a working volume 48. An exemplary resulting beam pattern is illustrated at the working volume 48. As described for the system shown in FIG. 1, the system 40 is controlled by a computer 49.

Figure 4:
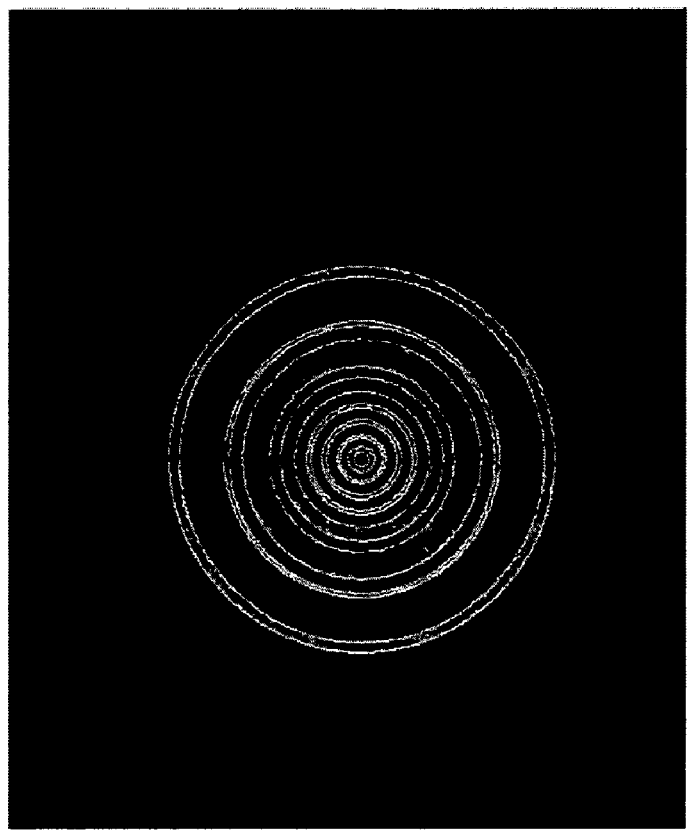
FIG. 4 shows an exemplary binary phase of S* which is the complex conjugated Fourier transform of the symbol, s
Figure 5:
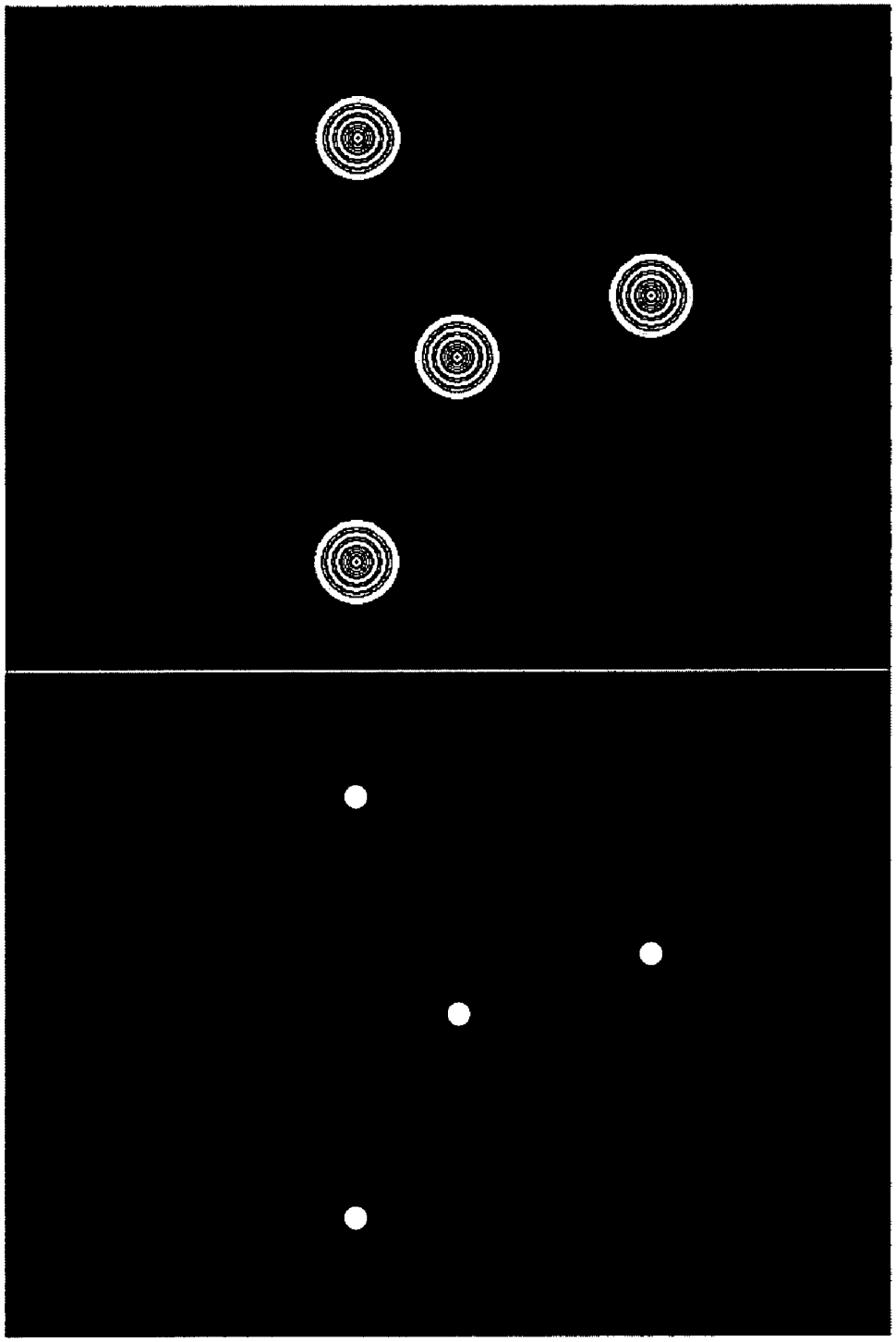
FIG. 5 shows four replicas of a binary amplitude symbol, s, at the input and the corresponding generated beams at the output due to filtering with the binary phase shown in FIG. 4.

FIG. 4 shows the phase pattern of a fixed phase mask constituting the first spatial light modulator in the system of FIG. 1. The illustrated phase pattern is a binary phase pattern wherein the black concentric rings do not phase shift incident radiation, i.e. the phase shift is zero, and the grey concentric rings phase shift incident radiation by π. The illustrated pattern is the phase, $-\Phi(u, v)$, of S* which is the complex conjugated Fourier transform of a symbol, s. Four replicas of the symbol, s, positioned in the object plane of the system of FIG. 1 are illustrated in the upper part of FIG. 5. The four replicas may be generated by a dynamic mirror device illuminated by a coherent light source, i.e. the replicas of, s, are amplitude modulated with zero phase modulation. The lower part of FIG. 5 shows the positions of the generated beams traversing the inverse Fourier plane (x', y'). The amplitude pattern of, s, has been optimized for maximum contrast of the beams against the region outside the beams. A similar phase pattern of, s, may be generated with a different spatial light modulator providing an increased light beam intensity provided that the first spatial light modulator also phase shifts the phase shifted electromagnetic radiation at the zero-order diffraction region of the Fourier plane with π.

Figure 6:
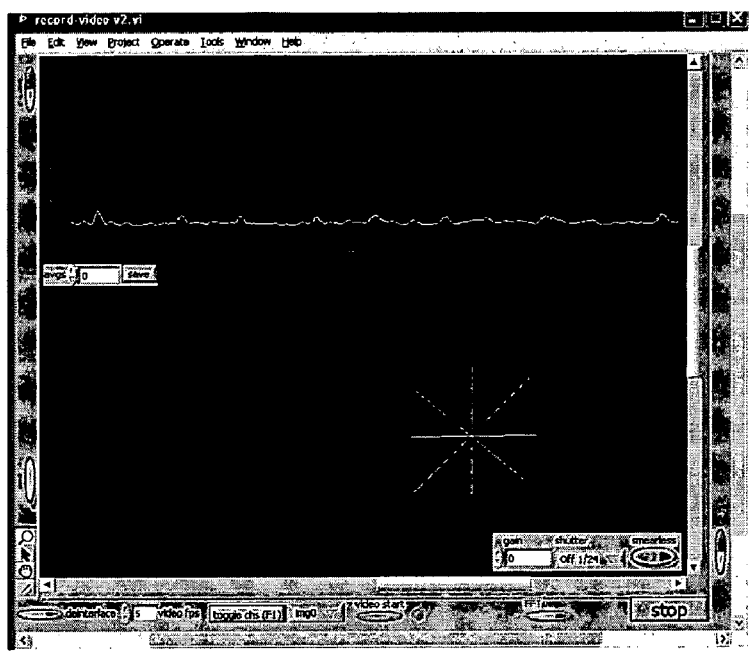
FIG. 6 shows a screen dump of the light intensity across one of the generated light beams of FIG. 5 in the inverse Fourier plane with an inactive first spatial light modulator.
Figure 7:
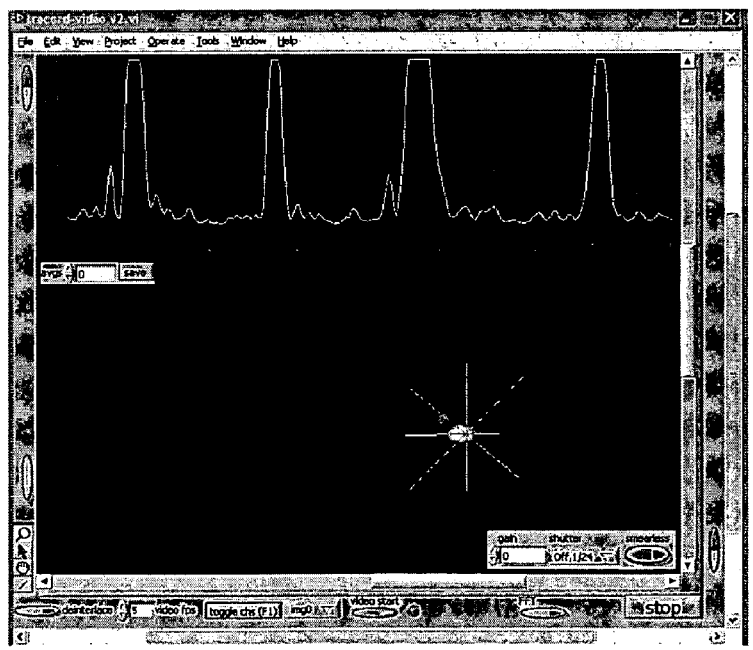
FIG. 7 shows a screen dump corresponding to FIG. 6, but with an active first spatial light modulator.

FIGS. 6 and 7 show screen dumps of the light intensity across one of the generated light beams of FIG. 5 in the inverse Fourier plane. The lower part of each screen dump shows four traces extending perpendicular to the propagation path of the light beam and with mutual angles of 45°. The upper part of each screen dump shows, side by side, the light intensity across the light beam for each of the four traces.

In FIG. 6, the first spatial light modulator has been switched off whereby a weak image of one of the binary amplitude symbol of FIG. 5 is seen.

In FIG. 7, the phase modulation of FIG. 4 is encoded by a reflecting phase modulating spatial light modulator constituting the first spatial light modulator whereby the desired light beams are generated as clearly seen in the upper part of FIG. 7 illustrating that a very bright beamlet is generated at the centre of the image of the symbol shown in FIG. 6. The beamlet saturates the detector even though the shutter speed has the same value as in FIG. 6 where the imaged symbol is hardly visible. This example clearly demonstrates the effectiveness of the described method.

The invention claimed is:

1. A method for synthesizing a set of light beams, comprising the steps of
    generating electromagnetic radiation with a set of replicas of a predetermined symbol, s, positioned at respective desired positions $(x_s, y_s)$ in an object plane o(x, y) intersecting the direction of propagation of the electromagnetic radiation, and having spatial amplitudes $a(x-x_s, y-y_s)$, spatial phases $\phi(x-x_s, y-y_s)$ and spatial polarisation vectors $p(x-x_s, y-y_s)$,
    Fourier transforming the electromagnetic radiation,
    phase shifting the Fourier transformed electromagnetic radiation with the phase $-\Phi(u, v)$ of S* which is the complex conjugated Fourier transform of the symbol, s,
    Inverse Fourier transforming the spatially modulated radiation, whereby a set of light beams are formed propagating through the inverse Fourier plane (x', y') at desired positions $(x'_s, y'_s)$, and
    moving a light beam by movement of the corresponding replica of the symbol, s.

2. A method according to claim 1, wherein the step of phase shifting includes multiplying the Fourier transformed electromagnetic radiation with the reciprocal amplitude of S* which is the complex conjugated Fourier transform of the symbol, s.

3. A method according to claim 2, wherein the phase shift θ is selected in such a way that the intensity level of at least a part of the inverse Fourier plane is zero.

4. A method according to claim 1, further comprising the step of phase shifting the phase shifted electromagnetic radiation at the zero-order diffraction region of the Fourier plane with a phase value θ for enhancement of intensity contrast in the inverse Fourier plane.

5. A method according to claim 4, wherein θ is substantially equal to π.

6. A method according to claim 1, wherein the step of generating electromagnetic radiation is performed with a second spatial light modulator for modulation of incident electromagnetic radiation by individual resolution elements of the spatial light modulator.

7. A method according to claim 6, wherein the second spatial light modulator is adapted to phase and/or amplitude and/or polarisation modulate incident electromagnetic radiation.

8. A method according to claim 1, wherein the power of the radiation source is controlled.

9. A method according to claim 1, wherein the symbol, s, is a binary coded symbol.

10. A system for synthesizing a set of light beams, comprising
    a light source for generation of electromagnetic radiation with a set of replicas of a predetermined symbol, s, positioned at respective desired positions $(x_s, y_s)$ in an object plane o(x, y) intersecting the direction of propagation of the electromagnetic radiation, and having spatial amplitudes $a(x-x_s, y-y_s)$, spatial phases $\phi(x-x_s, y-y_s)$, and spatial polarisation vectors $p(x-x_s, y-y_s)$,
    a Fourier transforming lens for Fourier transforming the electromagnetic radiation,
    a first spatial light modulator for phase shifting the Fourier transformed electromagnetic radiation with the phase $-\Phi(u, v)$ of S* which is the complex conjugated Fourier transform of the symbol, s,
    a Fourier transforming lens for Inverse Fourier transforming the spatially modulated radiation, whereby a set of light beams are formed propagating through the inverse Fourier plane (x', y') at desired positions ($x'_s$, $y'_s$), and a controller for controlling the position of a replica of the symbol, s, for movement of the corresponding light beam.

11. A system according to claim 10, wherein the first spatial light modulator is further adapted to multiply with the reciprocal amplitude of S* which is the Fourier transform of the symbol, s.

12. A system according to claim 10, wherein the first spatial light modulator is further adapted to phase shift the phase shifted electromagnetic radiation at the zero-order diffraction region of the Fourier plane with a phase value θ for enhancement of intensity contrast in the Inverse Fourier plane.

13. A system according to claim 12, wherein θ is substantially equal to π.

14. A system according to claim 10, wherein the light source comprises a second spatial light modulator for modulation of the amplitude and/or phase and/or polarisation of incident electromagnetic radiation by individual resolution elements of the second spatial light modulator.

15. A system according to claim 10, wherein the symbol, s, is a binary coded symbol.

16. A system according to claim 10, further comprising optics for directing at least two of the generated light beams to intersect each other at selected intersecting angles, preferably with focal points at the intersection.

17. A system according to claim 16, wherein the focal points of respective intersecting light beams are slightly displaced.

18. A system according to claim 10, further comprising optics for directing at least two of the generated light beams to intersect each other at a substantially 180° intersection angle.

* * * * *